US008826939B2

(12) United States Patent
Damaske et al.

(10) Patent No.: US 8,826,939 B2
(45) Date of Patent: Sep. 9, 2014

(54) DRAIN SYSTEM

(75) Inventors: Suzanne Damaske, Howell, MI (US);
Carrie Ellen Hall, Jackson, MI (US);
Dan Delaney, Pinckney, MI (US);
Kenneth J. Hall, Jackson, MI (US);
Andy Bialorucki, Lambertville, MI (US); George Grech, Garden City, MI (US)

(73) Assignee: Thetford Corporation, Ann Arbor, MI (US)

( * ) Notice: Subject to any disclaimer, the term of this patent is extended or adjusted under 35 U.S.C. 154(b) by 722 days.

(21) Appl. No.: 12/509,214

(22) Filed: Jul. 24, 2009

(65) Prior Publication Data

US 2010/0018590 A1    Jan. 28, 2010

Related U.S. Application Data

(63) Continuation-in-part of application No. 12/403,583, filed on Mar. 13, 2009, now abandoned.

(60) Provisional application No. 61/146,453, filed on Jan. 22, 2009, provisional application No. 61/036,096, filed on Mar. 13, 2008.

(51) Int. Cl.
*E03F 1/00* (2006.01)
*B60R 15/00* (2006.01)

(52) U.S. Cl.
USPC .......................................................... 137/899

(58) Field of Classification Search
CPC ....... E03F 1/008; F16L 25/0036; B60R 15/00
USPC ..................................... 137/899, 351, 355.12
See application file for complete search history.

(56) References Cited

U.S. PATENT DOCUMENTS

| | | | |
|---|---|---|---|
| 2,718,012 A | 9/1955 | Howe | |
| 3,320,621 A | 5/1967 | Vita | |
| 3,699,592 A | 10/1972 | Minchak | |
| 3,733,617 A | 5/1973 | Bennett | |
| 3,762,684 A | 10/1973 | Stein | |
| 3,811,462 A | 5/1974 | Feliz | |
| 3,878,569 A | 4/1975 | Peirish, Jr. et al. | |
| 3,899,012 A * | 8/1975 | Sather | 141/331 |
| 3,963,040 A | 6/1976 | Gezari | |

(Continued)

FOREIGN PATENT DOCUMENTS

WO    WO-2004039638 A2    5/2004

*Primary Examiner* — Eric Keasel
(74) *Attorney, Agent, or Firm* — Harness, Dickey & Pierce, P.L.C.

(57) ABSTRACT

A drain system for transporting waste from a vehicle to a discharge location located spaced from the vehicle may include first, second and third modular components. The first modular component may be adapted to coupling to the vehicle and may define a first male connection. The second modular component may include a waste transfer portion extending between a first end and a second end. The first end may define a first female connection and the second end may define a second male connection. The third modular component may include an angled central portion, a first end and a second end. The first end may define a second female connection. The second end may define a waste discharge end. The drain system may further include a fourth modular component defining a first end having an opening for receiving the waste discharge end of the third modular component and a second end for interfacing with a tubular intake of the discharge location.

21 Claims, 13 Drawing Sheets

(56) References Cited

U.S. PATENT DOCUMENTS

| | | | |
|---|---|---|---|
| 4,032,995 A | 7/1977 | Kemper | |
| 4,111,225 A | 9/1978 | Phelps | |
| 4,133,347 A | 1/1979 | Mercer | |
| 4,173,989 A * | 11/1979 | Prest | 138/109 |
| 4,223,702 A | 9/1980 | Cook | |
| 4,550,453 A | 11/1985 | Norman | |
| 4,554,949 A | 11/1985 | Sell | |
| 4,587,994 A | 5/1986 | Links et al. | |
| 4,643,229 A | 2/1987 | Hickin | |
| 4,722,556 A | 2/1988 | Todd | |
| 4,734,943 A | 4/1988 | Mellinger et al. | |
| 4,736,968 A | 4/1988 | Glegg | |
| 4,758,027 A | 7/1988 | Todd | |
| 4,779,650 A | 10/1988 | Sargent et al. | |
| 4,796,926 A | 1/1989 | Rapsilver | |
| 4,844,121 A | 7/1989 | Duke | |
| 4,846,212 A | 7/1989 | Scobie et al. | |
| 4,854,349 A | 8/1989 | Foreman | |
| D320,562 S | 10/1991 | Brester et al. | |
| D324,727 S | 3/1992 | Rowley | |
| D325,075 S | 3/1992 | Rowley | |
| 5,141,017 A | 8/1992 | Trottier | |
| 5,311,909 A | 5/1994 | Adcock | |
| 5,324,001 A * | 6/1994 | Duke | 251/147 |
| 5,330,233 A | 7/1994 | Kress | |
| 5,417,460 A | 5/1995 | Lunder | |
| 5,431,455 A | 7/1995 | Seely | |
| 5,653,262 A | 8/1997 | Hanemaayer | |
| 5,934,331 A | 8/1999 | Earl | |
| 5,947,156 A * | 9/1999 | Tomczyk | 137/899 |
| 5,971,438 A | 10/1999 | Johnson | |
| 5,987,658 A | 11/1999 | Richards et al. | |
| 6,029,707 A | 2/2000 | Couch | |
| D422,255 S | 4/2000 | Gonzales | |
| D441,848 S | 5/2001 | Huang | |
| 6,352,088 B1 | 3/2002 | Stegall | |
| 6,427,715 B1 | 8/2002 | Brockington et al. | |
| 6,550,074 B1 | 4/2003 | Allenbaugh et al. | |
| 6,607,009 B2 | 8/2003 | Schoellhorn et al. | |
| 6,698,457 B2 * | 3/2004 | Hayashi et al. | 138/127 |
| 6,802,343 B2 | 10/2004 | Faahs | |
| 6,832,409 B2 * | 12/2004 | Morgan et al. | 15/354 |
| 6,886,867 B1 | 5/2005 | Sutton et al. | |
| 6,957,668 B1 | 10/2005 | Highsmith | |
| 6,991,192 B2 | 1/2006 | Phillips et al. | |
| D514,663 S | 2/2006 | French | |
| 7,013,922 B2 | 3/2006 | Thum | |
| 7,144,046 B1 | 12/2006 | Lape, Sr. et al. | |
| D547,172 S | 7/2007 | Kent et al. | |
| D549,815 S | 8/2007 | Murphy | |
| D561,302 S | 2/2008 | Brockington et al. | |
| D564,637 S | 3/2008 | Brockington et al. | |
| D568,450 S | 5/2008 | King, Jr. et al. | |
| D585,348 S | 1/2009 | Yan et al. | |
| D586,433 S | 2/2009 | Price et al. | |
| 2002/0032926 A1 | 3/2002 | Lewis | |
| 2002/0179169 A1 | 12/2002 | Shanfelt | |
| 2003/0085571 A1 | 5/2003 | Avery | |
| 2004/0112432 A1 | 6/2004 | Swarts | |
| 2005/0150562 A1 | 7/2005 | Anderson | |
| 2006/0070660 A1 | 4/2006 | Swarts | |
| 2007/0007763 A1 | 1/2007 | Deaton | |
| 2007/0052235 A1 | 3/2007 | Buff | |
| 2007/0295420 A1 | 12/2007 | Swarts | |
| 2009/0236001 A1 | 9/2009 | Damaske et al. | |

\* cited by examiner

DRAIN SYSTEM

CROSS-REFERENCE TO RELATED APPLICATIONS

This application claims priority to U.S. patent application Ser. No. 12/403,583 filed 13 Mar. 2009, which claims priority to U.S. Provisional Patent Application Nos. 61/036,096 filed 13 Mar. 2008 and 61/146,453 filed 22 Jan. 2009, which applications are herein expressly incorporated by reference.

INTRODUCTION

The present teachings generally relate to a drain system for a vehicle. More particularly, the present teachings relate to a modular sewer drain system for emptying a holding tank of a vehicle such as a recreational vehicle (RV).

BACKGROUND OF THE INVENTION

Vehicles, including but not limited to recreational vehicles ("RVs" in the United States and "Caravans" in Europe), tractor trailers, airplanes, boats, trains, and the like, often incorporate sanitation systems for the comfort and convenience of the occupants.

Waste from the sanitation system may be stored in an on-board collection tank. Various arrangements have been employed for the periodic emptying of on-board collection tanks to a suitable storage location such as an underground tank or sewer. Examples of such arrangement include flexible hoses that may be stored in an external cabinet on the vehicle. Such hoses are connected to a discharge pipe on the vehicle and then manipulated to connect to an underground storage tank or the like.

While arrangements including those discussed above have proven to be successful for their intended applications, a continuous need for improvement with the pertinent art remains.

SUMMARY OF THE INVENTION

According to one particular aspect, the present teachings provide a drain system for transporting waste from a vehicle to a discharge location located spaced from the vehicle. The drain system may include first, second and third modular components. The first modular component may be adapted to coupling to the vehicle and may define a first male connection. The second modular component may include a waste transfer portion extending between a first end and a second end. The first end may define a first female connection and the second end may define a second male connection. The third modular component may include an angled central portion, a first end and a second end. The first end may define a second female connection. The second end may define a waste discharge end.

According to another particular aspect, the present teachings provide a drain system for transporting waste from a vehicle to a discharge location located spaced from the vehicle including a plurality of modular components and a common sealing member. The plurality of modular components interchangeable couple to define a path for transferring the waste from the vehicle to the discharge location. Each component of the plurality of components includes a least one of a male connection and a female connection. The common sealing member selectively seals one of the male connections to one of the female connections.

According to yet another particular aspect, the present teachings provide a drain system for transporting waste from a vehicle to a discharge location located spaced from the vehicle. The drain system includes a first component and a second component. The first component defines a waste discharge end. The second component defines a first end having an opening for receiving the waste discharge end of the first component and a second end for interfacing with a tubular intake of the discharge location.

According to still yet another aspect, the present teachings provide a modular component of a drain system for transporting waste from a vehicle to a storage location located spaced from the vehicle. The modular component includes a central hose member, a female coupling component and a male coupling component. The central hose member includes a first end and a second end. The female coupling component is located at the first end and the male coupling component is located at the second end. The female and male coupling components may be releasably connected with other modular components for the transportation of waste. Furthermore, the female and male coupling components are releasably securable to one another for storage of the modular component.

According to even yet another aspect, the present teachings provide a modular component of a drain system for transporting waste from a vehicle to a storage location located spaced apart from the vehicle. The modular component includes a male coupling component and a female coupling component. The female coupling component is secured to the male coupling component for relative rotation about an axis. The female coupling component is adapted to "threadably" engage an outlet of the vehicle. A compressible seal is carried by the male coupling component and oriented in a plane generally perpendicular to the axis. Rotation of the female coupling component about the axis linearly draws the male coupling component toward the outlet of the vehicle to compress the seal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF VARIOUS ASPECTS

The following description of various aspects of the present teachings is merely exemplary in nature and is in no way intended to limit the invention, its application or uses.

Figure 1:
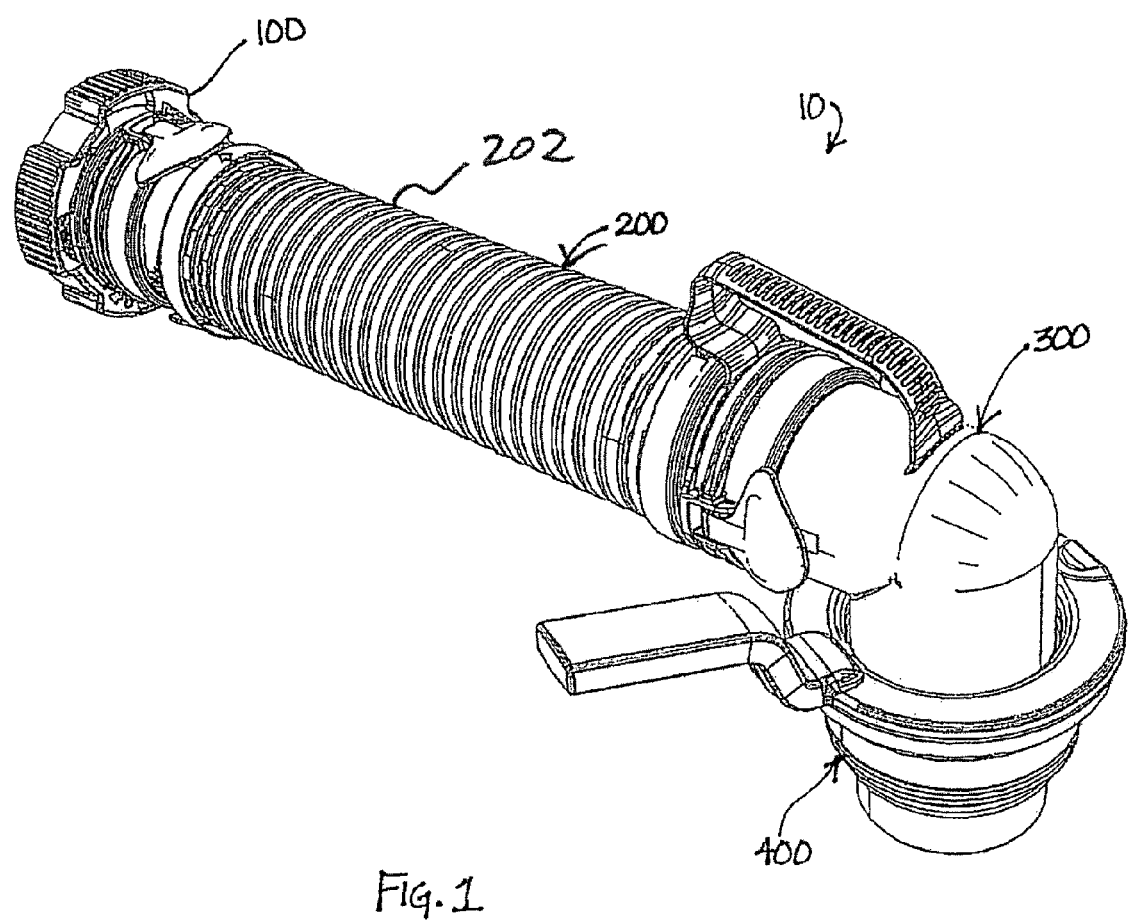
FIG. 1 is a perspective view of a drain system for a vehicle.
Figure 2:
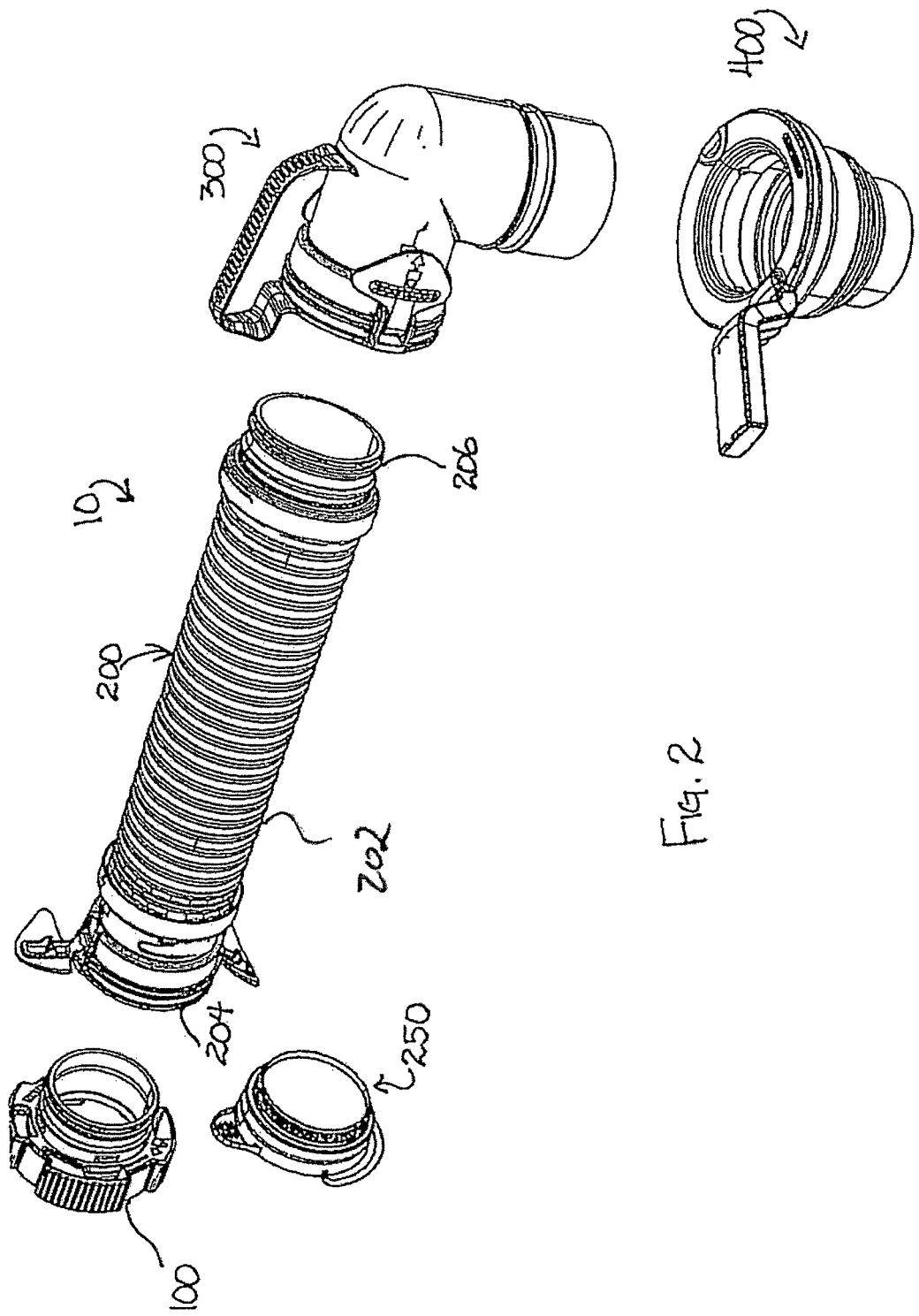
FIG. 2 is an exploded perspective view of the drain system for a vehicle of FIG. 1.
Figure 3:
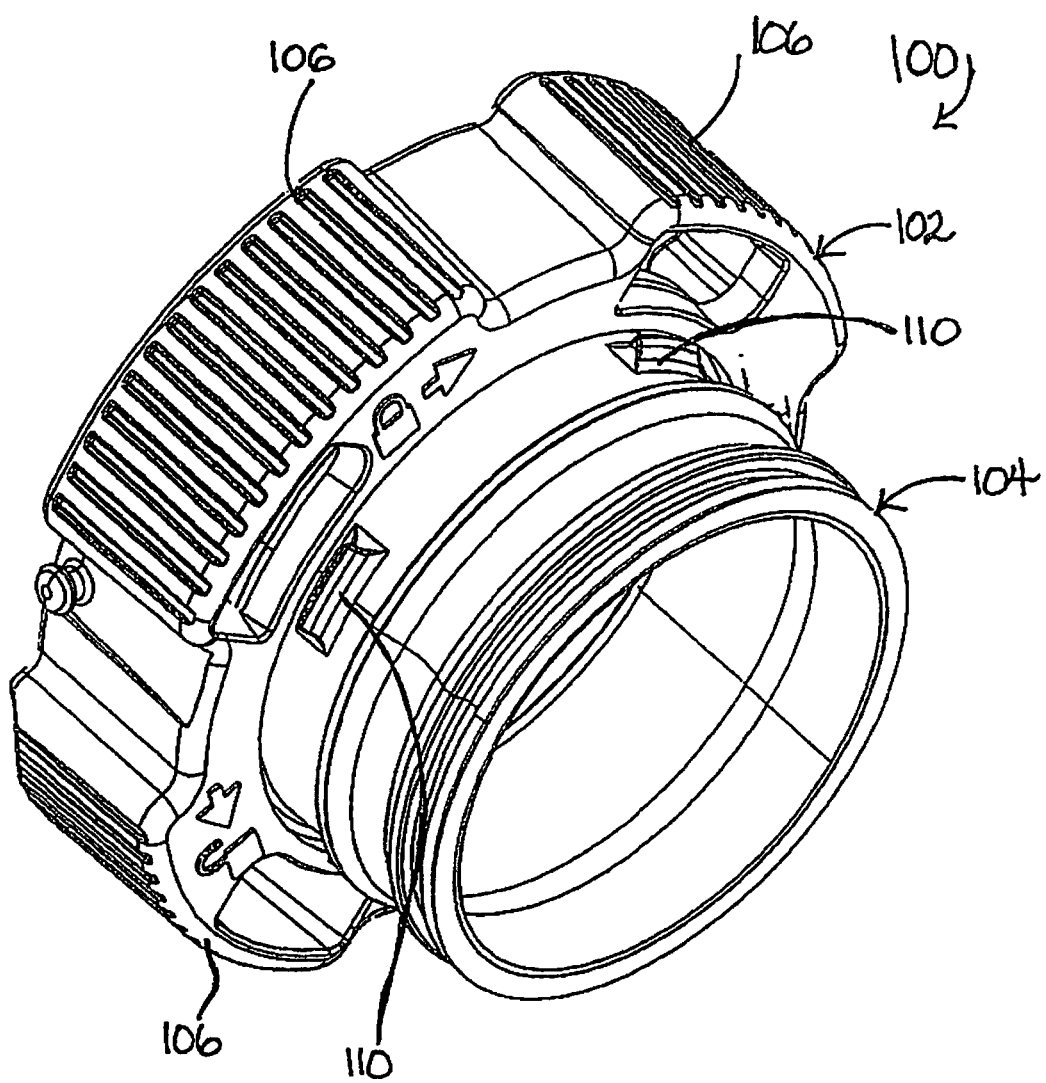
FIG. 3 is a perspective view of a first modular component of the drain system of FIG. 1.
Figure 4A:
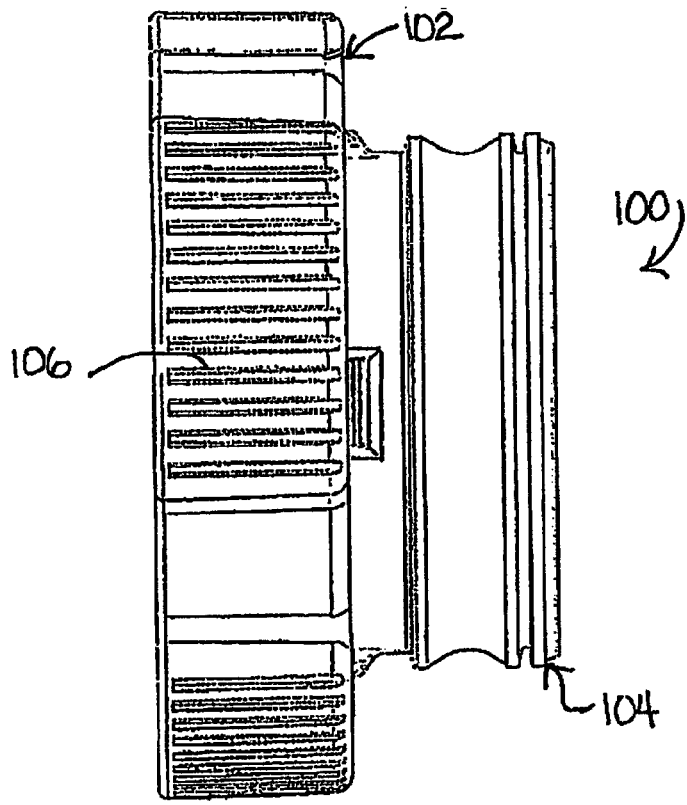
FIG. 4A is a side view of the first modular component of FIG. 3.
Figure 4B:
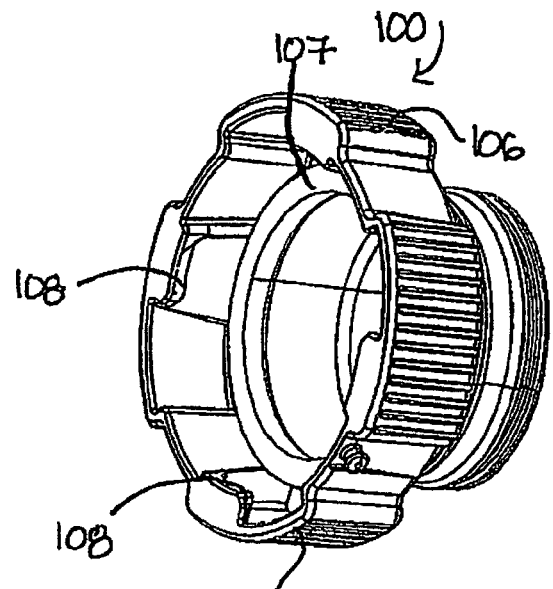
FIG. 4B is another perspective view of the first modular component of FIG. 3.
Figure 4C:
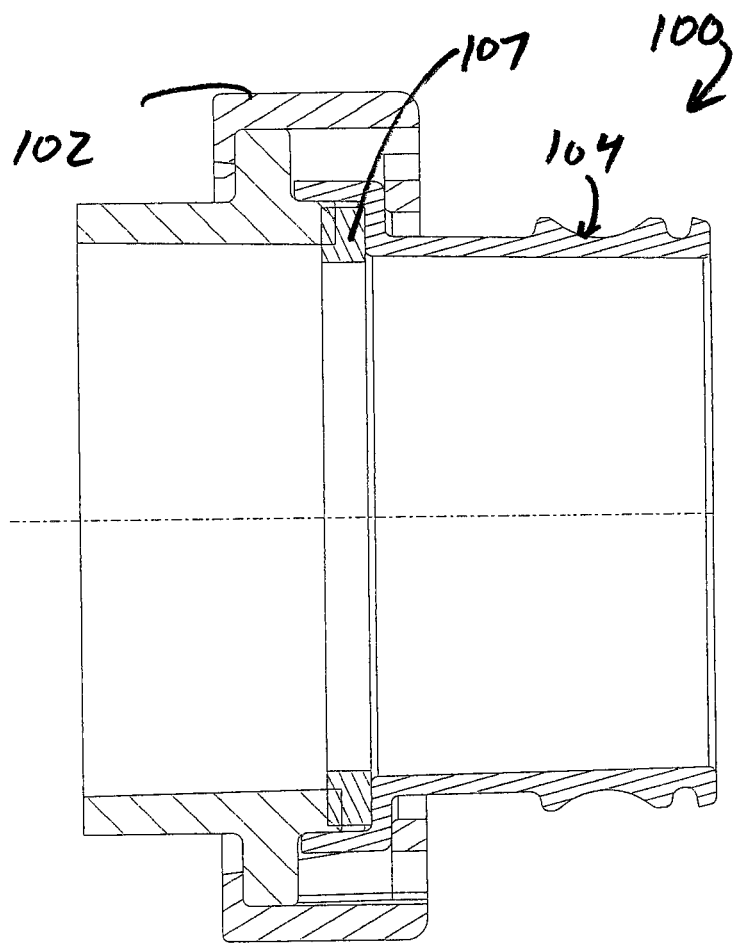
FIG. 4C is a cross-sectional view illustrating the rotational interconnection between the first and second portions of the first modular component.

With initial reference to FIGS. 1 and 2, a drain system in accordance with the present invention is illustrated and generally identified at reference character 10. As will become more apparent below, the drain system 10 provides a user with a system that can be quickly and easily assembled to have various functional capabilities for emptying holding tanks of vehicles to a location spaced from the vehicle such as a sewage disposal area. For example, the present teachings may be used to adapt an RV waste holding tank for emptying to a sewer. While particularly adapted for an RV, however, it will be understood that the present teachings are not so limited. In this regard, the present teachings have application for marine vehicles and other situations involving the transfer of waste or wastewater to a disposal area.

The drain system 10 may generally include a plurality of modular units or components. The modular components may generally include a first component 100, a second component 200, a third component 300, and a fourth component 400. The drain system 10 may further include a cap member 250. It will be understood that a greater or lesser member of modular components may be included within the scope of the present teachings.

With continued reference to FIGS. 1 and 2 and additional reference to FIGS. 3, 4A-4C, the first modular component or unit of the present teachings may comprise an RV fitting 100. In accordance with the particular application illustrated, the first modular component 100 may generally function to couple a waste receptacle drain of a vehicle with the second modular component 200. In this regard, the first modular component 100 may be integrally formed of any suitable material to generally include a first end 102 for coupling to the waste receptacle drain and a second end 104 for coupling to the second modular component 200.

The first end 102 may define a female coupling component. The second end 104 may define a male coupling component. The female coupling component may be secured to the male coupling component for relative rotation about an axis. A compressible seal 107 may be carried by the second end 104 or male coupling component. The compressible seal 107 may be oriented generally in a plane perpendicular to the axis.

The first modular component 100 may have a radial mechanism design for ergonomic and geriatric considerations. The actuation effort requirement may be low through part geometry and use of a compressible seal 107. In one particular application, the seal 107 may be constructed of EPDM or closed cell foam rubber. Positive detents 108 may be incorporated into the first portion 102 to cooperate with the waste receptacle drain and to signal that connection has been made.

In use, the first portion 102 is rotated relative to the second portion 104 for attachment of the first modular component 100 to the waste receptacle drain of the vehicle. As the first portion 102 is rotated, the detents 108 engage cooperating structure carried by the waste receptacle drain and draw the first modular component 100 toward the vehicle. This action services to linearly compress the seal 107 and thereby reduce associated effort. Because the second portion 104 does not rotate during this process of attachment to the vehicle, there is no friction between the seal 107 and the waste receptacle drain that need be overcome, resulting in improved durability and attachment performance. Additionally, there is no twisting or bending translated to components that may be connected to the second portion 104.

The first modular component 100 may further include an integrally formed grip surface. As illustrated, the first portion 102 of the first modular component 100 may include a plurality of radially extending segments 106. In the embodiment illustrated, the plurality of radially extending segments 106 may include four segments. It will be appreciated, however, that a greater or lesser number of segments may be incorporated. The segments 106 may be equally spaced about the perimeter of the first portion 102 and may be formed to include grip surfaces. The grip surfaces may comprise a plurality of axially extending grooves.

The first modular component 100 may optionally incorporate a flex joint (not particularly shown). The flex joint may extend, retract and provide a rotational joint for positioning the next modular unit (e.g., the second modular component 200) to be connected. The first modular component 100 may have the ability to include many additional modular features but is not limited to a valve, a wash out assembly, a chemical introduction cartridge and a flex joint.

The second portion 104 of the first modular component 100 may be generally cylindrical and may define a reduced diameter portion relative to the first portion 102. The second portion 104 may include a plurality of snap features 110. The snap features 110 may be radially spaced about the second portion 104. These snap features 110 provide a joint between the first portion 102 and that the second portion 104 that may freely rotate. This enables connection of the second modular component without rotation and without any particular radial orientation. The second portion 104 may define a male connection member for coupling with an adjacent modular component (e.g., the second modular component 200). The second portion 104 provides the planar force for seal compression in the adjacent modular unit.

As shown in FIGS. 1 and 2, the second modular component 200 may extend between adjacent modular components (e.g., the first and third modular components 100 and 300). The second modular component 200 may include, but is not limited to, a macerator (see FIG. 10 in this regard), a telescoping tube set, and hose assemblies. These modular units may be coupled into the drain system independently or coupled to function together with a bypass/valve system. The modular units may allow the user to modify the system depending on a length of stay or particular hook-up. The modular units may remain coupled to each other for storage as a self-contained system. In situations where the user has limited space, the modular units may be decoupled in various lengths/combinations and stowed independently.

In the particular embodiment illustrated, the second modular component 200 includes a central hose member or waste transfer member 202, a first end 204 and a second end 206. The first end 204 may define a female coupling component or connection member. The second end 206 may define a male coupling component or connection member. The first end 204 may incorporate a latching arrangement for coupling to a male connection component of an adjacent modular component. The latching arrangement may be substantially similar to a latching arrangement of the third modular component 300 which is described further below. It will be noted that the design of the levers is unique in shape and are sized to fit into small storage spaces typically found in vehicles that require the present product. The male connection member of the second end 206 may be substantially identical to the male connection member of other components (e.g., of the first modular component 100) to facilitate variable interconnection between the various components. It should be noted that this cam lock design has been optimized for storage considerations, geriatric considerations and the waste removal process.

The waste transfer member 202 may simply include a standard sewer hose. In various embodiments, the waste transfer member 202 may be tubular or flat and may further include a retractable, co-extruded material with or without an exoskeleton for protection and durability. An optional exoskeleton may be incorporated. In this regard, a plastic helix may be molded on an outside of the cover material of the hose. The waste transfer member 202 may contain a plastic helix co-extruded to an outer skin of a hose material for improved product performance. According to one particular application, the hose cover material to which the plastic helix is co-extruded may be SEBS elastomer. One suitable SEBS elastomer is commercially available in China known as TL-8031. This cover material is widely used in auto sunroof sealing, vibration cushion, trundle, tubing, extrusion profile seal, etc. It provides excellent hand feel, strong adhesion ability with PP. It can be re-used and it is environmental friendly material. Thus it provides hose durability improvements for this intended drain application. The plastic helix may be flexible and form-retaining. It provides a crush resistant hose again not found in a sewer drain application. The cover material portion of the waste transfer member 202 may be opaque or translucent to allow a user to see if the main body portion is occluded.

The second modular component 200 may include additional features such as a device to warn of a trip hazard, internal sprinkler/chemical introduction system for deodorizing and sanitizing, flow indicator and/or clean out capability. The components and features of this modular unit may be connected by mechanical fastening, chemical bonding or sequential molding. The second modular component 200 may include an optional tote, or be part of the tube set for storage. It may also be included in an integral storage compartment in the vehicle/source.

Figure 5A:
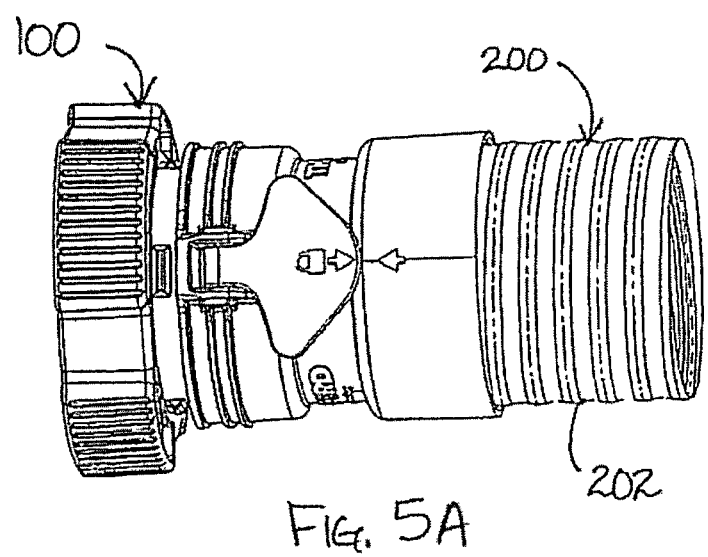
FIG. 5A is a perspective view of a portion of a second modular component of FIG. 1, the second modular component shown operatively coupled with the first modular component.
Figure 5B:
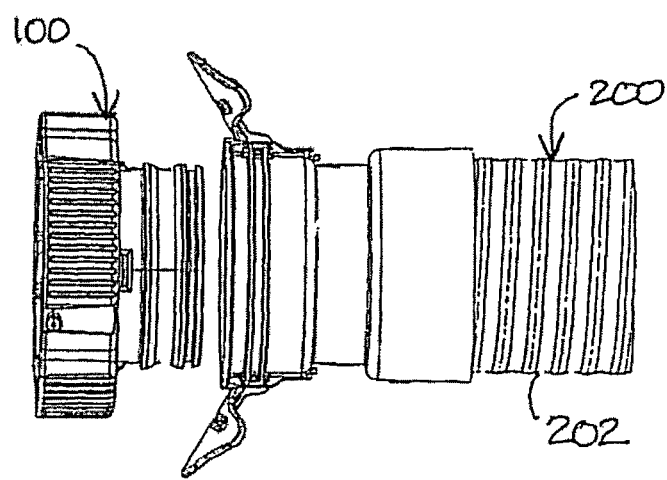
FIG. 5B is a side view of the first and second modular components of FIG. 5A shown prior to coupling.

Attachment of the first modular component 100 to the second modular component 200 is shown particularly in FIGS. 5A and 5B. FIG. 5A shows the components 100 and 200 as they are connected. FIG. 5B shows the components prior to connection. The latching of these components will be described further below with respect to the coupling between the second and third modular components 200 and 300 which will be understood to be substantially identical.

Figure 6:
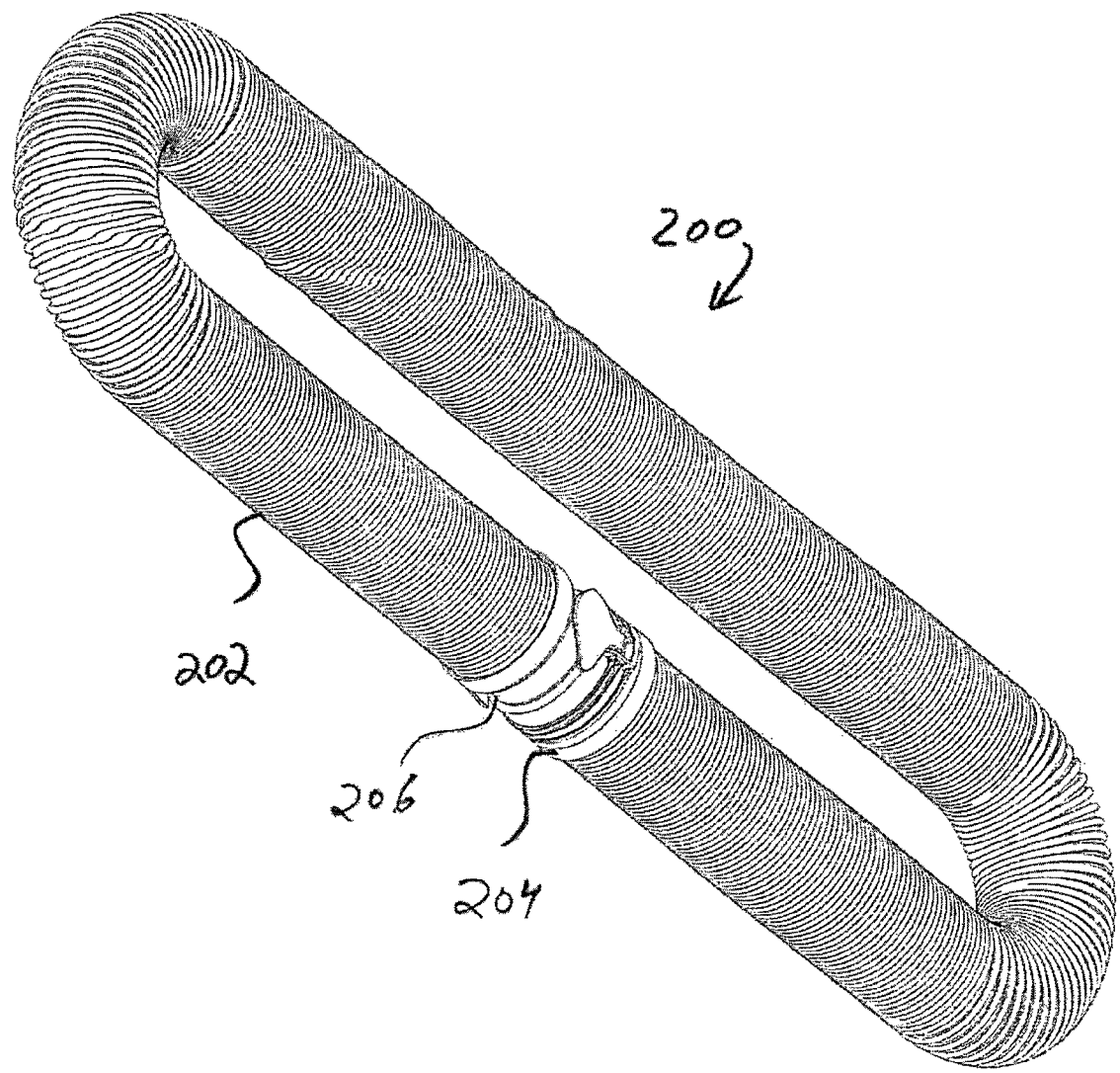
FIG. 6 is a perspective view of the second modular component illustrating a first end coupled to a second end for storage.

With particular reference to FIG. 6, the second modular component 200 is illustrated in a storage condition. In this condition, the first and second ends 204 and 206 may releasably engage one another. As such, the second modular component 200 defines a closed structure that will not leak residual waste that may be present in the hose 202.

Figure 7A:
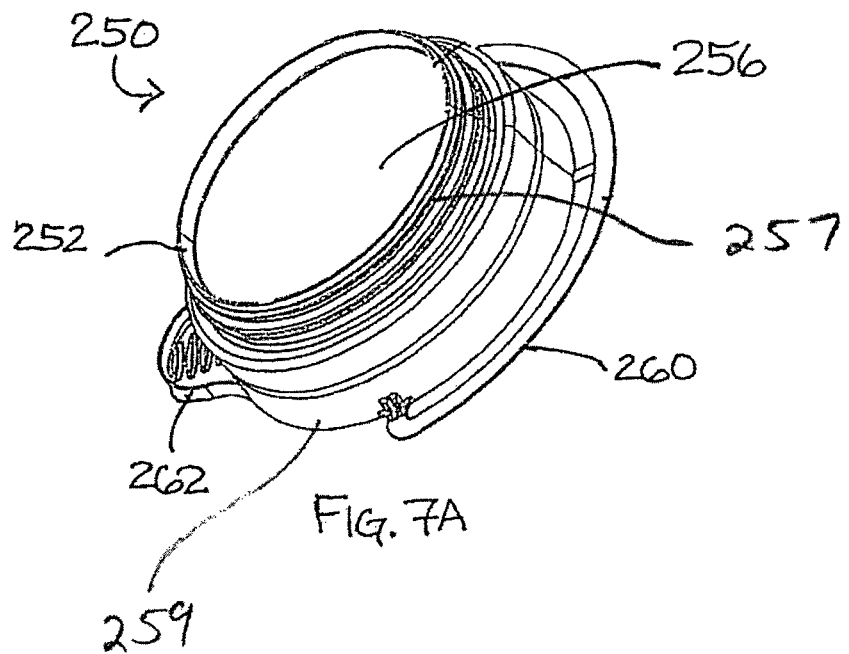
FIGS. 7A and 7B are perspective views of a cap in accordance with the present teachings, the cap operative for sealing one or more other components.
Figure 7B:
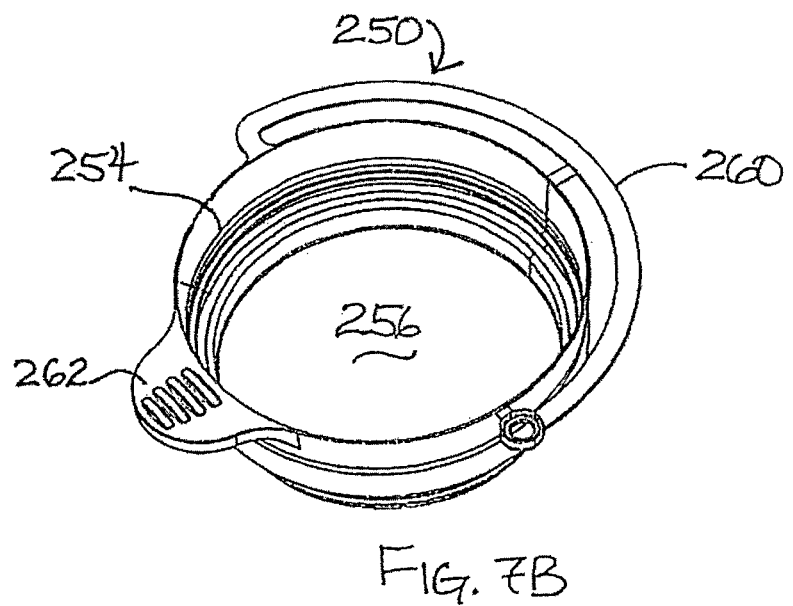
Figure 8A:
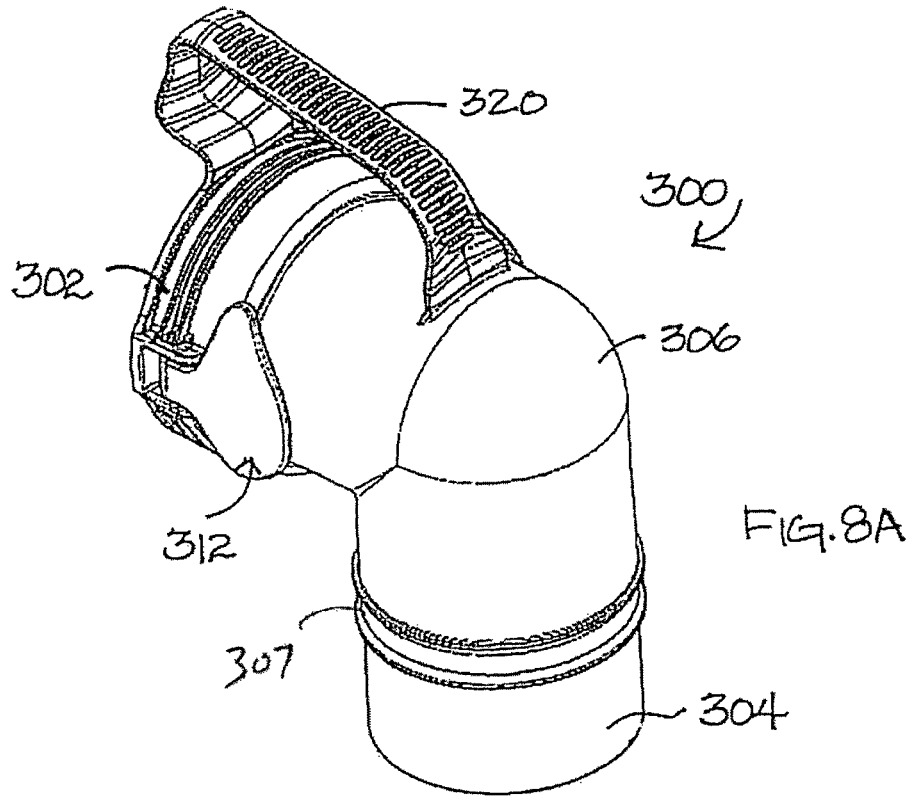
FIGS. 8A-8E are various views of a third modular component of the drain system of FIG. 1.
Figure 8B:
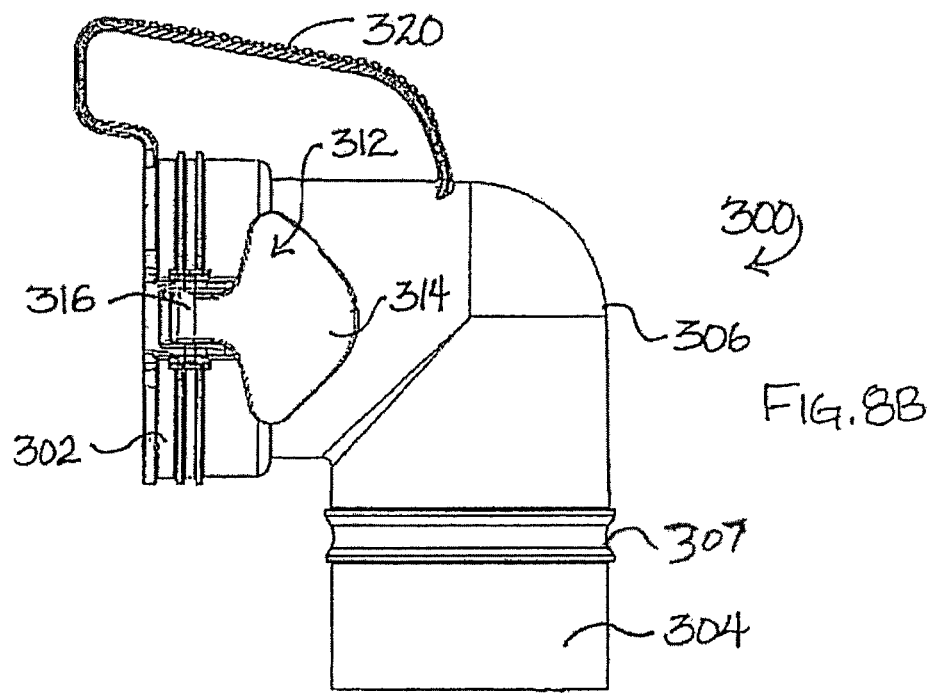
Figure 8C:
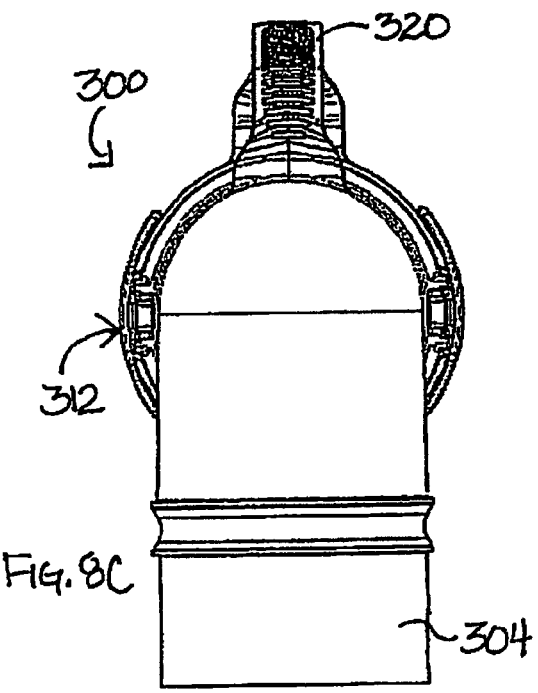
Figure 8D:
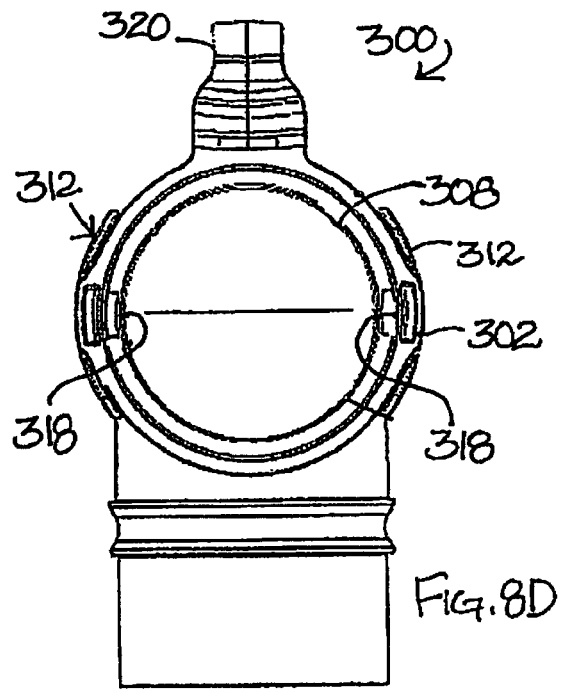
Figure 8E:
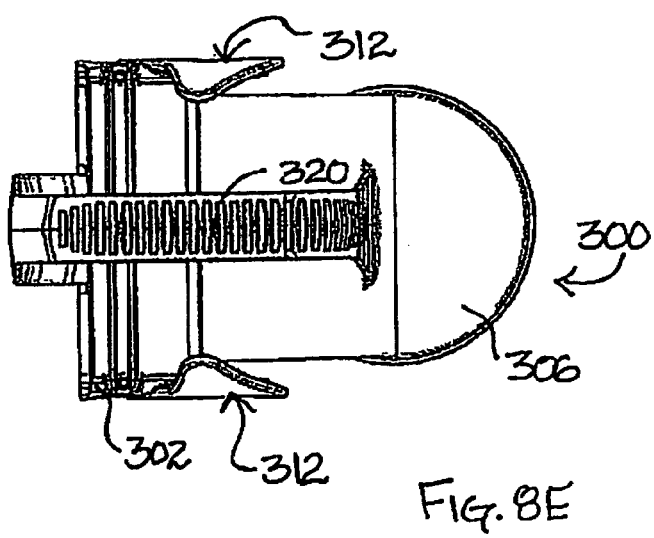

With particular reference to FIGS. 7A and 7B, the cap member 250 is illustrated. The cap member 250 may be particularly adapted for selective engagement with a male connection component, a female connection component, or end of one of the modular components of the present teachings. In this regard, the cap member 250 may define a first end or male end 252 and a second end or female end 254. The cap member 250 may be attached to either end of the various modular components to provide sanitary storage.

The male end 252 may be sized and configured to be received by a female connection component or end of one of the modular components. In this regard, an outer diameter of the male end 252 may be formed similar to the female connection end of the various modular components of the present teachings. Conversely, the female end 254 may be sized and configured to be received by a male connection component of one of the modular components. An inner diameter of the female end 254 may be formed similar to the male connection end of the various modular components of the present teachings. Explaining further, male end 252 may cap either end 407 or 406 of the fourth modular component 400 in a press fit relationship. An intermediate portion 257 of the cap 250 may snap in end 304 of the third component 300. A larger diameter portion 259 may be force fit into female coupling components of the second and third modules 200 and 300, for example. The female end 254 may cap the male coupling components of the system 10. Again, the common end wall 256 may serve to block flow of any remaining residue in the system after use (i.e., during storage).

The cap member 250 may be integrally formed of any suitable material. The cap member 250 may be formed to include an integral tether 260 and an integral handle 262. The handle 262 may radially extend from a main body portion of the cap member 250. The integral tether 260 may extend about a portion of the periphery of the main body portion and may be secured to the main body portion at spaced apart points. The cap member may include the additional feature of integrating the cam lock levers similar to the second and third module (not shown).

With particular reference to FIGS. 8A through 8e, the third modular component 300 will be described. The third modular component 300 may be a spout/nozzle for interconnecting the second modular component 200 with the fourth modular component 400. For example, the third modular component 300 may generally function for selective and releasably couple a waste transfer component (e.g., the second modular component 200) with a sewer adapter (e.g., the fourth modular component 400). Alternatively, the third modular component 300 may directly deliver waste to a remote location such as a stationary holding tank or sewer.

The third modular component 300 may include a first end 302, a second end 304 and a central body 306. The first end 302 may define a female cam lock connection component for selectively engaging a male connection component of an adjacent module. Note end 302 is substantially identical to end 204 of the second modular component. The second end 304 may define a waste discharge end. The central body 306 may orientate the first and second ends 302 and 304 at an angle relative to one another. As illustrated, the angle may be approximately 90 degrees.

As discussed above, the first end 302 may carry a latching arrangement for coupling adjacent components. The latching arrangement may comprise a universal coupling device that may eliminate the need for module orientation and rotational attachment, resulting in improved durability and attachment performance. In this regard, the first end 302 may define an opening 308 adapted to receive a male connection component when the male connection component is advanced into the opening 308 in a generally axially direction.

The latching arrangement may include one or more cam lever locking mechanisms 312. In the embodiment illustrated, the latching arrangement includes two substantially identical cam lever locking mechanisms 312. The locking mechanisms 312 may be positioned on radially opposite sides of the first end 302. The underside of the locking mechanisms includes an undercut that engages to a detent features molded into body 302. These two features when engaged provide a snap fit lock between the locking mechanisms and first end 302. The locking mechanism 312 may include integrally formed, or unique members having a first end or handle 314 and a second end 316 or unique pin.

The first end 314 may be an enlarged, cantilevered end to reduce effort. The design of these levers has been optimized for storage in a typical RV. The first end may be form fitting to generally follow the adjacent curvature of the third modular component 300 and may include a cam portion 318 extending into the interior of the first end 302. The second end may be integral to the first end 314 or a unique pin 316 that pivotally couples to the third modular component 300. The cam portion 318 may be particularly adapted to cooperate with a male connection component of an adjacent modular component to secure the components upon rotation from a first position to a second position allowing infinite position of the modular component 100 relative to the second modular component 200 and modular component 200 relative to the third modular component 300. The first position is shown in FIG. 5A, for example. The second position is shown in FIG. 5B, for example. The rotation of levers 312 linearly draws the male connection of one module unit in the female connection of the adjacent modular unit compressing the seal located in the female connection. To the extent not otherwise described herein, it will be understood that the latching mechanisms cooperate with adjacent male connection components in a conventional manner. This interface has been particularly optimized for the low-pressure environment of dumping waste. Closure effort is optimized for this low pressure sewage dump application (geriatric installation) vs. typical high pressure applications available in the market.

Proximate the end 304, the third modular component 300 may be formed to include an interface geometry 307. This interface geometry 307 may be identical to the male connection component 206 of the second modular component 200, for example. The interface geometry 307 may cooperate with corresponding interface geometry 407 of the fourth modular component 400.

The third modular component 300 may be formed to integrally include a handle 320. The handle 320 may comprise a strap extending between the first end 302 and the central portion 306. A central portion of the handle may extend generally parallel to an adjacent portion of the third modular component 300. The central portion may be formed to include grooves or other grip enhancing structure.

Figure 9B:
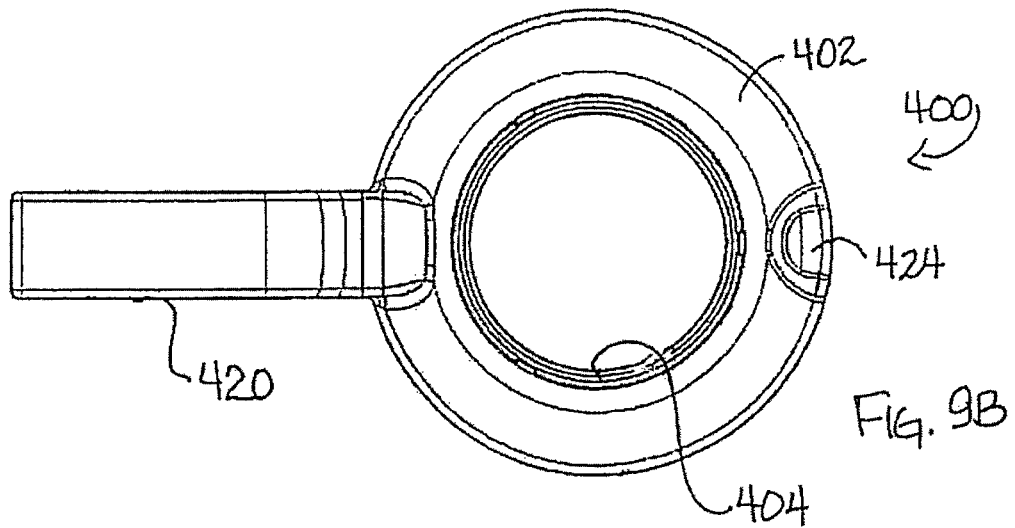
FIGS. 9A-9D are various views of a fourth modular component of the drain system of FIG. 1.
Figure 9A:
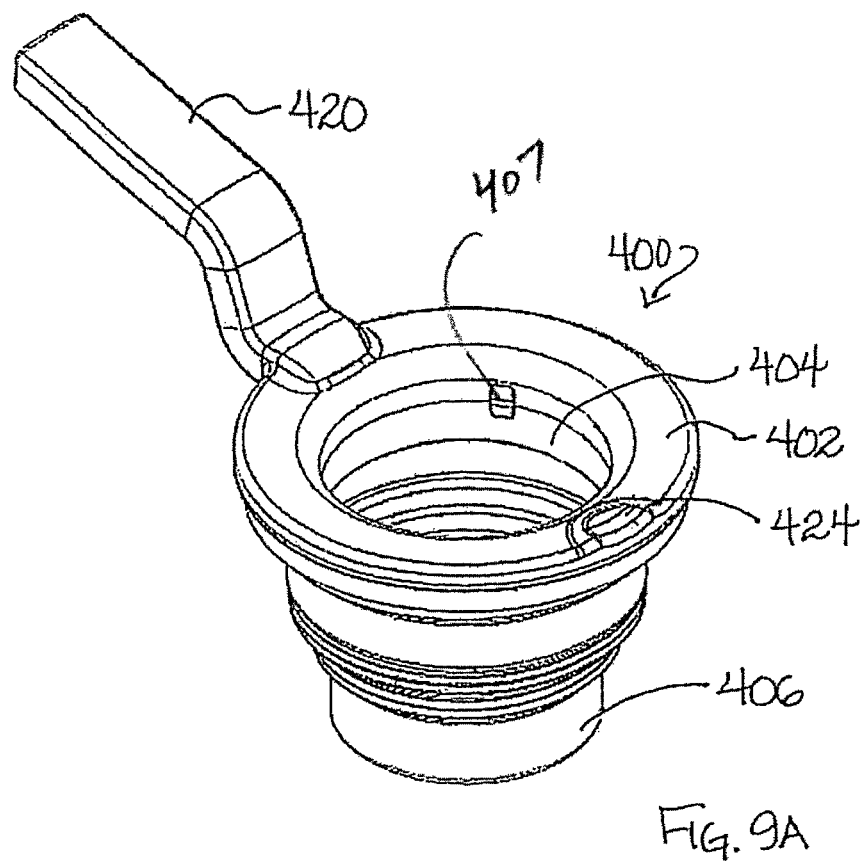
Figure 9C:
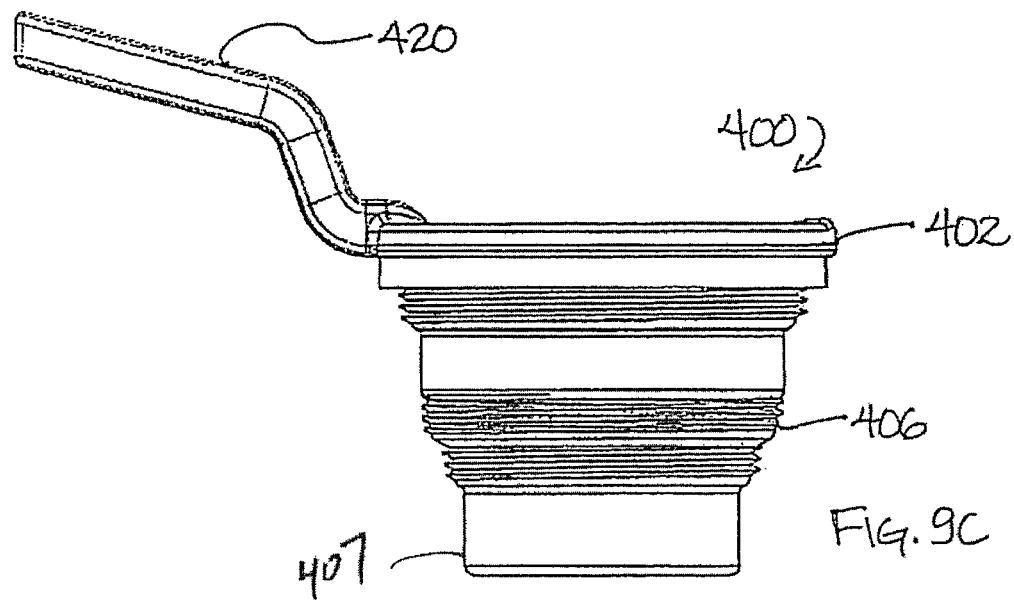
Figure 9D:
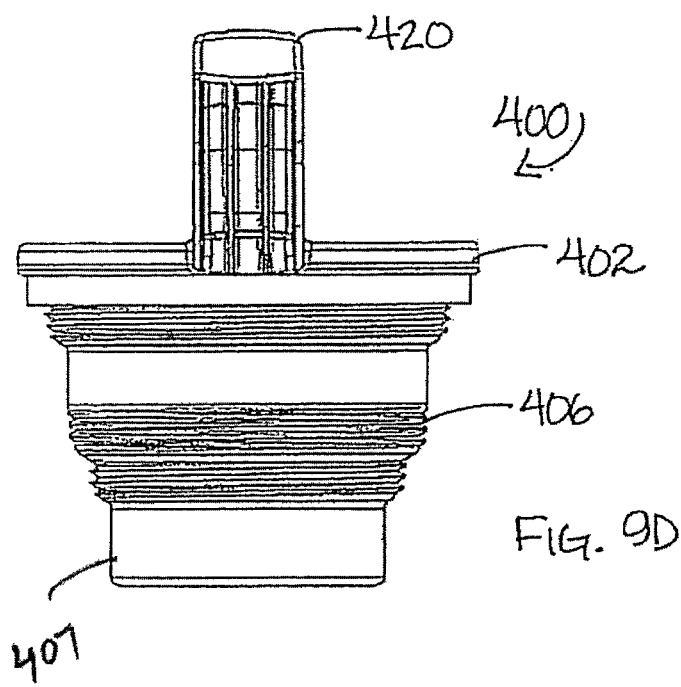

With particular reference to FIGS. 9A-9B, the fourth modular component or sewer fitting 400 will be further described. The fourth modular component 400 may generally function to couple the third component 300 with a remote waste disposal area. As noted above, however, the second and third modular components 200 and 300 may alternatively be coupled directly to a sewer fitting by by-passing the fourth modular component 400. The second modular component 200 may be alternatively coupled directly to the fourth modular component 400.

The fourth modular component 400 may generally include a first end 402 defining an opening 404 for receiving the end 304 of the third modular component 300 or the end 206 of the second modular component 200. The fourth modular component 400 may further generally include a second end 404 defining a plurality of interface features for coupling to various tubular elements. In the embodiment illustrated, the second end 406 may define five integral interface features. It will be appreciated by those skilled in the art, however, that a greater or lesser number of interface features may be incorporated. The integral interface features of the second end 406 may include a combination of threaded and unthreaded interface features of various diameters that interface with a waste inlet.

The fourth modular component 400 may additionally incorporate a handle 420. The handle may be integrally formed with the remained of the fourth modular component 400. As shown, the handle 420 may radially extend from the first end 402 of the fourth modular component 400. The particular shape of the handle 420 shown in the drawings will be understood to be merely exemplary. In this regard, the present teachings will be understood as not limited to the particular shape illustrated. A rim of the first end 402 may define a depression 424 to assist the user.

Figure 10:
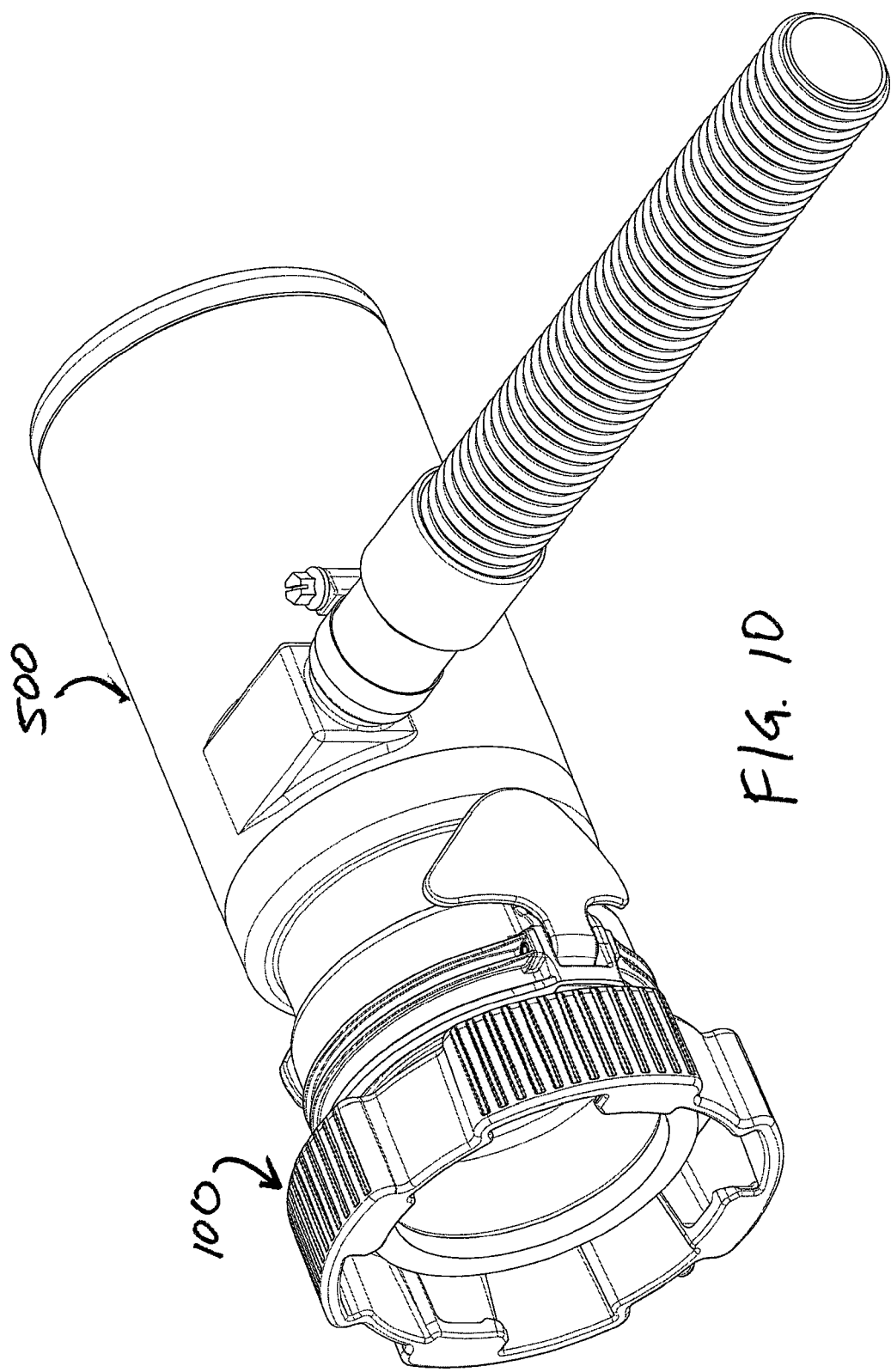
FIG. 10 is a perspective view of the first modular component shown operatively attached to a macerator unit.

Turning to FIG. 10, the first modular component is illustrated operably attached to a macerator unit 500. In this regard, the second modular unit 200 has been replaced with the macerator unit 500. It will be understood that the macerator unit may include structure similar to the second modular component 200 for releasably coupling to the first modular component 200.

As noted above, the fourth modular component 400 may include interface geometry 407 for releasably coupling the third and fourth modular components 300 and 400. The interface geometry may include a plurality of detents 407 or other structure for engagement with corresponding interface geometry 307 of the third modular component 300. This geometry is substantially identical to 206 of the second modular component.

The above description describes an exemplary construction incorporating the various teachings of the present system 10. It will now be understood that alternative constructions may incorporate a greater number or a lesser number of modular components. Additionally, it will be understood that the various components may be interchangeable coupled within the scope of the present teachings and integrated into one another for a simplified design. Further in this regard, while specific examples have been described in the specification and illustrated in the drawings, it will be understood by those skilled in the art that various changes may be made and equivalence may be substituted for elements thereof without departing from the scope of the present teachings as defined in the claims. The mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description.

What is claimed is:

1. A drain system for transporting waste from a vehicle to a discharge location located spaced from the vehicle, the drain system comprising:
   a first modular component having a vehicle engaging portion for directly coupling to the vehicle, the first modular component defining a first male connection, the vehicle engaging portion circumferentially surrounding the first male connection and rotatable relative to the first male connection;
a second modular component including a waste transfer portion extending between a first end and a second end, the first end defining a first female connection and the second end defining a second male connection, the waste transfer portion defining a flexible hose extending entirely from the first end to the second end and permanently connected to the first and second ends; and
a third modular component including an angled central portion, a first end and a second end, the first end defining a second female connection, the second end defining a waste discharge end;
wherein during use of the drain s stem the first female connection of the second modular component is releasably coupled to the first male connection of the first modular component and the second male connection of the second modular component is releasably coupled to the second female connection of the third modular component and further herein during storage of the second modular component the first and second ends of the second modular component are selectively couplable to one another.

2. The drain system for transporting waste of claim 1, further comprising a fourth modular component, the fourth modular component defining a first end having an opening for receiving the waste discharge end of the third modular component and a second end for interfacing with a tubular intake of the discharge location.

3. The drain system for transporting waste of claim 2, wherein the second end of the fourth modular component includes a plurality of integral interface features.

4. The drain system for transporting waste of claim 3, wherein the plurality of integral interface features includes at least five interface features.

5. The drain system for transporting waste of claim 3, wherein the plurality of integral interface features includes a combination of threaded and unthreaded interface features of various diameters.

6. The drain system for transporting waste of claim 1, further comprising a sealing cap for selectively sealing any one of the first and second male connections, any one of the first and second female connections, and any of the waste discharge end.

7. The drain system for transporting waste of claim 6, wherein the sealing cap includes a female end adapted to seal one of the first and second male connections and an opposite male end adapted to seal one of the first and second female connections or discharge ends.

8. The drain system for transporting waste of claim 6, further comprising a fourth modular component, the fourth modular component defining a first end having an opening for receiving the waste discharge end of the third modular component and a second end for interfacing with a tubular intake of the discharge location, wherein a male end of the sealing cap selectively caps both of the first and second ends of the fourth modular component, an intermediate portion of the cap selectively snaps in the waste discharge end of the third modular component and a larger diameter portion of the cap selectively is force fit into both the first female connection of the second modular component and the second female connection of the third modular component.

9. The drain system for transporting waste of claim 1, wherein the waste transfer portion of the second modular component includes a plastic helix.

10. The drain system for transporting waste of claim 1, wherein the waste transfer portion includes a main body and a plastic helix molded on an outside of the main body.

11. The drain system for transporting waste of claim 10, wherein the main body of the waste transfer portion is formed of a flexible outer layer and the plastic helix that is flexible and memory retaining.

12. The drain system for transporting waste of claim 10, wherein the main body of the waste transfer portion is translucent.

13. The drain system of claim 10, wherein the plastic helix is co-extended to an outer skin of the main body.

14. The drain system of claim 13, wherein the main body is a SEBS elastomer.

15. The drain system of claim 10, wherein the plastic helix makes the main body crush resistant.

16. The drain system for transporting waste of claim 1, wherein the waste portion of the second modular component is flexible and the first female connection is releasable engageable with the second male connection.

17. The drain system for transporting waste of claim 1, wherein the second male connection of the second modular component is substantially identical to the first male connection of the first modular component to facilitate variable interconnection.

18. The drain system for transporting waste of claim 17, wherein the second female connection of the third modular component is substantially identical to the first female connection of the second modular component.

19. A drain system for transporting waste from a vehicle to a discharge location located spaced from the vehicle, the drain system comprising:
a first modular component having a vehicle engaging portion for directly coupling to the vehicle, the first modular component defining a first male connection, the vehicle engaging portion circumferentially surrounding the first male connection and rotatable relative to the first male connection;
a second modular component including a waste transfer portion extending between a first end and a second end, the first end defining a first female connection and the second end defining a second male connection; and
a third modular component including an angled central portion, a first end and a second end, the first end defining a second female connection, the second end defining a waste discharge end;
wherein the waste transfer portion includes a main body and a plastic helix molded on an outside of the main body, wherein the second male connection of the second modular component is substantially identical to the first ale connection of the first modular component to facilitate variable interconnection, and wherein the second female connection of the third modular component is substantially identical to the first female connection of the second modular component.

20. A drain system for transporting waste from a vehicle to a discharge location located spaced from the vehicle, the drain system comprising:
a first modular component having a vehicle engaging portion for directly coupling to the vehicle, the first modular component defining a first male connection, the vehicle engaging portion circumferentially surrounding the first male connection and rotatable relative to the first male connection;
a second modular component including a waste transfer portion extending between a first end and a second end, the first end defining a first female connection and the second end defining a second male connection, wherein the second male connection of the second modular component is substantially identical to the first male connection of the first modular component to facilitate variable interconnection; and a third modular component including an angled central portion, a first end and a second end, the first end defining a second female connection, the second end defining a waste discharge end, wherein the second female connection of the third modular component is substantially identical to the first female connection of the second modular component.

21. A drain system for transporting waste from a vehicle to a discharge location located spaced from the vehicle, the drain system comprising:
  a first modular component having a vehicle engaging portion for directly coupling to the vehicle, the first modular component defining a first male connection, the vehicle engaging portion circumferentially surrounding the first male connection and rotatable relative to the first male connection;
  a second modular component including a waste transfer portion extending between a first end and a second end, the first end defining a first female connection and the second end defining a second male connection, the waste transfer portion defining a flexible hose extending entirely from the first end to the second end and permanently connected to the first and second ends; and
  a third modular component including an angled central portion, a first end and a second end, the first end defining a second female connection, the second end defining a waste discharge end;
  a fourth modular component, the fourth modular component defining a first end having an opening for receiving the waste discharge end of the third modular component and a second end for interfacing with a tubular intake of the discharge location; and
  a sealing cap having a male end, an intermediate portion and a larger diameter portion, the end of the sealing cap for selectively capping both of the first and second ends of the fourth modular component, the intermediate portion of the cap for snapping in the waste discharge end of the third modular component and the larger diameter portion of the cap for force fitting into both the first female connection of the second modular component and the second female connection of the third modular component.

* * * * *